UNITED STATES PATENT OFFICE.

OTTO BEST, OF DAGGETT, CALIFORNIA.

PROCESS OF MANUFACTURING BORIC ACID.

No. 837,378.        Specification of Letters Patent.        Patented Dec. 4, 1906.

Application filed June 18, 1906. Serial No. 322,237.

*To all whom it may concern:*

Be it known that I, OTTO BEST, a citizen of the United States, residing at Daggett, in the county of San Bernardino and State of California, have invented new and useful Improvements in Processes of Manufacturing Boric Acid, of which the following is a specification.

This invention relates to a process for preventing the formation of gelatinous silica in working borosilicates into boric acid.

Hitherto high-grade borosilicates (pandermite, &c.) have been but little, and low-grade borosilicates only with great loss of time, labor, and material, worked into boric acid on account of gelatinous silica separating out at different stages of the manufacture, dependent upon the prevailing conditions. The aim of the present invention is to prevent the separation of this gelatinous silica, and thus render this source of borate more easily available for the manufacture of boric acid.

The gelatinous silica will be hereinafter designated as "jelly."

The process now used in California to manufacture boric acid from these borosilicates (mainly low grade) is to add to the ground ore suspended in water sulfuric or sulfurous acid to release the boric acid from the borosilicates that are mostly combined with lime. Other suitable acids may be used to release the boric acid.

The boric and silicic acids may be combined with other bases, and, in varying amounts, other compounds may be present, such as calcium sulfate, calcium carbonate, and silicates of alumina, iron, magnesia, lime, &c.

At present the only compounds that need be considered are the borates and silicates.

Supposing that (for illustration) sulfuric acid is used to decompose the ore, the reactions now to be considered would be the following: First, calcium borate plus sulfuric acid form calcium sulfate plus boric acid; second, calcium silicate (or any other silicate present and decomposable by acid) plus sulfuric acid form calcium sulfate (or other sulfate) plus soluble silicic acid. The mother-liquor that subsides from the muddy residue can be filtered or separated from the mud by settling or any other suitable process and holds in solution boric acid, varying amounts of silicic acid, and more or less salts, (sulfate of iron, alumina, magnesia, &c.) If the mother-liquor is too weak, it is evaporated to crystallization, here in California by solar evaporation, or if strong enough heated and the boric acid crystals separated by cooling. After standing for a longer or shorter time or on evaporation jelly separates, this separation taking place sooner or later, according to the amount of silicic acid in solution, the concentration of the liquor, the amount of impurities in solution, and many other conditions. This jelly carries with itself whatever was present in the liquid before gelatinization, and naturally also the boric acid; but whenever this jelly is formed the common methods of extracting the boric acid from it are unavailable. This jelly is at present usually worked by evaporating it down to dryness to render the silicic acid insoluble and then extracting the boric acid from the now pulverulent material. This process is very slow and expensive and entails much loss of boric acid.

My improved process aims to prevent the formation of jelly, and thus avoid the loss of time, labor, and material.

The principle of this new process is to add to the solution containing boric acid and silicic acid such materials and chemical compounds as form insoluble compounds with the silicic acid, thus precipitating the soluble silicic acid, and prevent the later formation of jelly. Just enough of this chemical compound must be added to saturate and separate the silicic acid without combining with the boric acid. If intermediary borates are formed, they will be decomposed again so long as silicic acid is in the solution, as mostly all silicates are less soluble than the corresponding borates.

The process itself is carried out as follows: The borosilicate ore is ground, stirred up with water, and a sufficient quantity of sulfuric or any other suitable acid is added to bring all the boric acid into solution. Varying amounts of silicic acid are then in solution also. I now add to this decomposed ore milk of lime, or I add the lime ground in the form of a fine powder. The added lime forms an insoluble compound with the soluble silicic acid and precipitates the same as calcium silicate, thus removing it from the liquor and preventing the later formation of jelly in the solution. Instead of lime any other base forming an insoluble compound with the silicic acid can be used, such as magnesia, oxids or hydroxids of barium, iron, &c. The chemical reaction taking place is very simple. Soluble silicic acid plus lime form insoluble silicate of lime, or in case of another base being used the corresponding insoluble silicate. The reaction may not be completed at once in the decomposing-tanks, but may be completed during the process of evaporation, separating insoluble silicate of lime or other insoluble silicate in the upper evaporators. Also carbonates instead of caustic bases or any other salt combined with a weak acid, like acetate of lime, may be used. In the case of the carbonate, however, the reaction is very slow. Caustic lime, or in this case also caustic soda, potash, and carbonate of soda or potash, &c., can be used in combination with magnesia, iron, alumina, salts, &c. The reaction then is as follows, it being supposed that in all cases sulfuric acid is used for decomposing the ore: If magnesia sulfate is used, we get, first reaction, magnesia sulfate plus caustic lime form calcium sulfate plus magnesia hydroxid; second reaction, magnesia hydroxid plus soluble silicic acid form insoluble silicate of magnesia. These reactions of course go on simultaneously. In this case the hydroxid is freshly precipitated in a nascent state, and therefore readily combines with the soluble silicic acid.

For caustic lime any other base or carbonate that precipitates out the hydroxid, like caustic soda, potash, or in some cases the corresponding carbonates, &c., may be substituted. For magnesia sulfate any other sulfate or salt the base of which forms an insoluble compound with silicic acid may be used.

It is readily to be seen from the reactions given above that if magnesia or other salts are present in the water or are extracted from the ore by the sulfuric or other acid, which is always more or less the case, not only the soluble silicic acid is removed, but these salts at the same time. This process, therefore, not only prevents the formation of jelly, but at the same time purifies the liquor and frees it of contaminating salts. Wherever and whenever such salts are in the mother-liquor a correspondingly smaller quantity of these salts need be added, and in some cases none at all may be needed.

A third point has been attained by this new process. It is found that with this treatment the mud subsides and the liquor clears quicker, so that more and clearer liquor can be drawn off wherever settling is used. This is of the greatest importance, particularly in the working of low-grade materials.

I claim—

1. The process of making boric acid from borosilicates without the formation of "jelly," which consists in decomposing the borosilicate with a suitable acid to release the boric acid, then adding a base to form an insoluble silicate, and then separating the liquor from the precipitated silicate, substantially as described.

2. The process of making boric acid from borosilicates without the formation of "jelly," which consists in decomposing the borosilicates with a suitable acid to release the boric acid, then adding slaked lime in proportion to the silicic acid in solution, stirring to mix well and permit the lime to combine with the silicic acid, and separating the liquor from the precipitated silicate, substantially as described.

In testimony whereof I have hereunto set my hand in the presence of two subscribing witnesses.

OTTO BEST.

Witnesses:
T. S. VAN DYKE,
D. S. VAN DYKE.